(12) United States Patent
Vivier

(10) Patent No.: US 10,481,424 B2
(45) Date of Patent: Nov. 19, 2019

(54) GLASS PANEL COMPRISING A LIQUID CRYSTAL FILM

(71) Applicant: AGC GLASS EUROPE, Louvain-la-Neuve (BE)

(72) Inventor: Jonathan Vivier, Beuzet (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 52 days.

(21) Appl. No.: 15/316,048

(22) PCT Filed: May 28, 2015

(86) PCT No.: PCT/EP2015/061787
§ 371 (c)(1),
(2) Date: Dec. 2, 2016

(87) PCT Pub. No.: WO2015/185428
PCT Pub. Date: Dec. 10, 2015

(65) Prior Publication Data
US 2017/0090224 A1 Mar. 30, 2017

(30) Foreign Application Priority Data
Jun. 4, 2014 (EP) .................................. 14171131

(51) Int. Cl.
*G02F 1/1334* (2006.01)
*G02F 1/137* (2006.01)
*B32B 17/10* (2006.01)

(52) U.S. Cl.
CPC ...... *G02F 1/1334* (2013.01); *B32B 17/10036* (2013.01); *B32B 17/10504* (2013.01); *B32B 17/10651* (2013.01); *B32B 17/10761* (2013.01); *B32B 17/10779* (2013.01); *B32B 2255/20* (2013.01); *B32B 2605/006* (2013.01); *G02F 1/137* (2013.01); *G02F 2001/13756* (2013.01)

(58) Field of Classification Search
CPC ................... G02F 1/1334; G02F 1/137; G02F 2001/13756; B32B 17/10504
See application file for complete search history.

(56) References Cited

U.S. PATENT DOCUMENTS

| | | |
|---|---|---|
| 5,156,452 A | 10/1992 | Drzaic et al. |
| 5,285,299 A | 2/1994 | Drzaic et al. |
| 5,724,238 A | 3/1998 | Schulz et al. |
| 5,835,174 A | 11/1998 | Clikeman et al. |
| 5,976,405 A | 11/1999 | Clikeman et al. |

(Continued)

FOREIGN PATENT DOCUMENTS

| | | |
|---|---|---|
| FR | 2 997 517 A1 | 5/2014 |
| JP | 6-186529 A | 7/1994 |

(Continued)

OTHER PUBLICATIONS

International Search Report dated Sep. 1, 2015, in PCT/EP2015/061787, filed May 28, 2015.

*Primary Examiner* — Ramsey Zacharia
(74) *Attorney, Agent, or Firm* — Oblon, McClelland, Maier & Neustadt, L.L.P.

(57) ABSTRACT

A laminated automotive glazing including a PDLC film powered electrically by an AC current or a frequency lower than 100 Hz. The voltage varies non-sinusoidally, and a maximum of an effective voltage does not exceed 80 Vrms.

18 Claims, 4 Drawing Sheets

(56) References Cited

U.S. PATENT DOCUMENTS

| | | | |
|---|---|---|---|
| 2011/0094585 A1* | 4/2011 | Debije | C09K 19/588 |
| | | | 136/257 |
| 2013/0188105 A1* | 7/2013 | Dobrenko | E06B 9/24 |
| | | | 349/16 |

FOREIGN PATENT DOCUMENTS

| | | |
|---|---|---|
| JP | 2004-93873 A | 3/2004 |
| JP | 2013-72895 A | 4/2013 |

* cited by examiner

GLASS PANEL COMPRISING A LIQUID CRYSTAL FILM

The invention relates to automotive glazings including a liquid-crystal film and more particularly polymer films in which liquid crystals are dispersed (polymer dispersed liquid crystals PDLC). The use of these films is intended to allow the optical properties of a glazing to be modified by means of an electric command. More precisely, the aim of this use is to allow the glazing to be passed from a state in which it scatters practically all incident light, to a state in which it scatters as little as possible. This change of state is respectively controlled by the absence of an electric field in the first case and the application of the electric field in the second case.

Publications have in particular disclosed that these glazings may especially be implemented in the form of automobile roofs. This is for example the case of the unpublished patent application PCT/EP2014/05994 filed on 28 Feb. 2014. The application targeted in this patent application is subject to various constraints certain of which are specific to the automotive field. Among these constraints feature conditions relating to the electrical control of these films.

In more conventional applications, for example relating to the formation of partitions employed as screens in buildings, the means used for this electrical control may be adapted without too much difficulty. It may for example be a question of the choice of the required voltage or of the consumed power. The connection to the mains allows a certain latitude even if devices are then required to select the best conditions.

Implementation in the field of automotive glazings means that supplies that are not ordinarily used must be. It is in particular necessary to supply the electrodes of the film with a voltage of several tens of volts. Normally, when it is not a question of large trucks, the DC power supply of automotive vehicles is able to supply about 12 to 14 volts. It is therefore necessary to convert this supply to obtain the conditions required to implement liquid-crystal films. Similarly, the supply must be an AC supply and indeed a variable frequency supply. An AC current is required to prevent modification of the required dispersion of these crystals in the polymer from degrading the properties of the films during their use. Implementation of these films therefore necessarily requires the use of DC/AC converters.

In addition to these basic conditions, the fact that the vehicle must operate autonomously, and the multiplication of the number of functional components requiring an electrical power supply, means that it is necessary for these products to consume a minimum of power even if, considered in isolation, said electrical power supply remains relatively modest. The power supply must also be as small in size as possible and be maintained by suitable cooling at a fairly low temperature. All this therefore leads the operating mode that uses the least possible power to be preferred.

The conditions of supply of the liquid-crystal films are firstly dependent on the nature of the products implemented. The choice of the latter depends on the required optical properties. Therefore, there is not much scope to change these conditions. In automotive uses, the best gauges of performance are the magnitude of the variation in the amount of scattering between the two extreme states, and above all the amount of scattering in the actuated state. The latter amount, to meet the requirements of manufacturers, must be practically inexistent. In practice, in architectural partitioning applications a residual amount of scattering of about 8-10% is observed. For automotive applications this amount of scattering must preferably be lower than 5% and advantageously lower than 3%.

As indicated in the aforementioned prior patent application, the residual scattering is in part dependent on the applied voltage. However, the latter cannot be increased without limit. Above a certain threshold, the risk of "breakdown" of the film becomes significant. To prevent this drawback the applied voltage is necessarily limited. For films of satisfactory thickness, i.e. those that make it possible to achieve, on the one hand, the lowest possible amount of residual scattering and, on the other hand, a very high amount of scattering in the unactuated state in order to form a veritable "screen" ensuring the sought-after privacy, the applied voltage normally does not exceed 220 V and is most often about 70 Vrms.

The frequency chosen depends on the response times of the film. It is such that the observer does not perceive the alternation associated with this frequency. Persistence of vision leads a frequency that is no lower than 20 Hz and advantageously no lower than 25 Hz to be used. In the most usual applications, a much higher frequency of about 100 Hz or more is chosen.

Moreover, in conventional applications, the converters used generate a substantially sinusoidal voltage variation.

It is also well known that PDLC films are sensitive to temperature. When the latter increases, the effect of the electric field tends to attenuate. The crystals orientate less easily because they become more mobile. To maintain the same effect, the power delivered to the film must be increased. Beyond a certain limit, it is no longer possible to compensate for the loss in film response by increasing power. For most PDLC films, the temperature from which the film scatters radically less when the electric field is applied thereto is about 60 to 80° C. If the temperature is decreased the film regains its initial properties. At higher temperatures, of about 110-120° C., the degradation of the film may become irreversible. Manufacturers wish to preserve the adequate transition up to a temperature of at least 50° C. and preferably of at least 60° C., to allow for the natural heating to which automotive glazings are exposed.

The various constraints explained above leave a limited margin for improvement in the conditions of implementation. Nevertheless the inventors have sought to optimize the performance and especially the power consumption of the use of PDLC films in automotive glazings. The solution proposed is such as specified in claim 1. They have thus shown that the choice of a voltage that does not follow a sinusoid allows a similar optical effect to be obtained with a lower power.

A non-sinusoidal and especially trapezoidal or square voltage having a given base frequency F may be represented by a series comprising the higher harmonic frequencies 2F, 3F, etc. A suitable choice of base frequency thus allows possible interference with fluorescent-tube light sources, the frequency of which is usually 50 Hz, to be avoided.

Preferably, according to the invention, the voltage varies according to a trapezoidal mode. Using a "square" mode leads to an instantaneous variation in current that leads to an extremely accentuated peak at the start of each period. A more gradual potential variation allows the peak in current to be minimized as indicated in the following examples.

For the frequencies chosen according to the invention, the voltage rise time is advantageously comprised between 0.5 and 2 milliseconds.

The effect of the decrease in required power is felt in the operation of the PDLC film, but also in the converters which dissipate as heat about a quarter of the total power. This decrease therefore leads to a substantial improvement.

The choice of a limited rms voltage also leads to a lower maximum voltage. According to the invention, the voltage is preferably no higher than 55 Vrms and particularly preferably no higher than 50 Vrms. By limiting the voltage, the safety constraints set in automotive standards are moreover more easily met.

The inventors have also shown that the limitation of the frequency is a factor that allows power consumption to be decreased. Nevertheless, to maintain the perception of continuity, the frequency is no lower than 20 Hz and preferably no lower than 25 Hz.

According to the invention, the frequency is advantageously at most equal to 50 Hz, but, for the aforementioned reason of possible interference, it is preferable not to choose precisely the value of 50 Hz.

Under the indicated conditions, the power dissipated in the film in the actuated state, with a residual scattering that is no higher than 5% and advantageously no higher than 3%, may be limited to a value not exceeding 10 W per square meter of film, and which may advantageously be lower than 5 W per square meter.

If the conditions are well-defined as indicated above, and the choice of film appropriate, the implementation of a PDLC film according to the invention makes it possible to keep the scattering in the actuated state at very low values including when the temperature is above room temperature without exceeding 50 or even 60° C.

BRIEF DESCRIPTION OF THE DRAWINGS

The invention is described below with reference to the figures in which.

Figure 1:
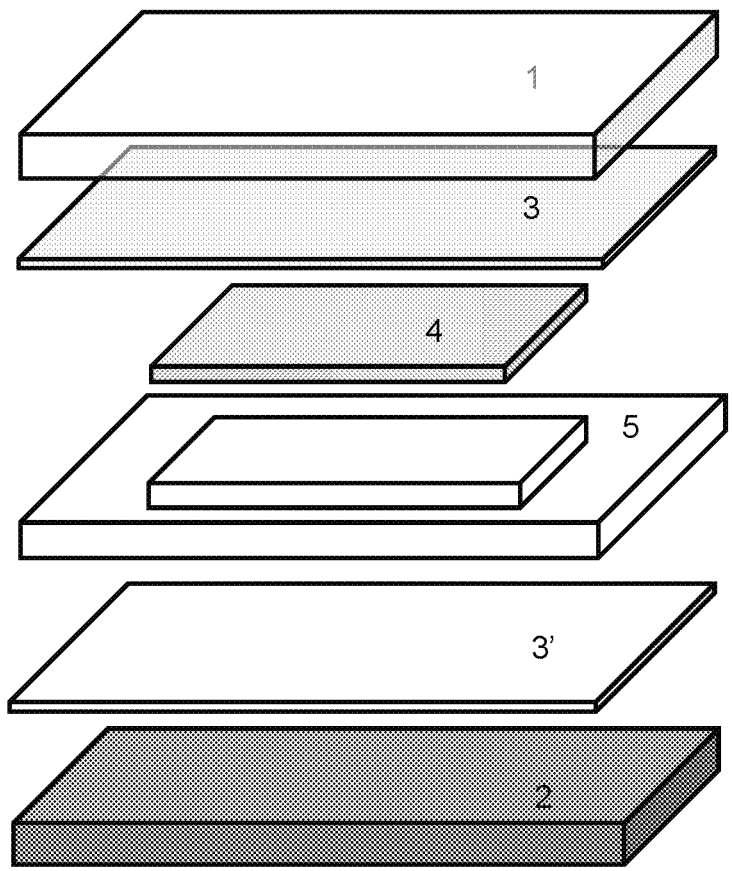
FIG. 1 shows a schematic exploded view of a glazing comprising a PDLC film.
Figure 2:
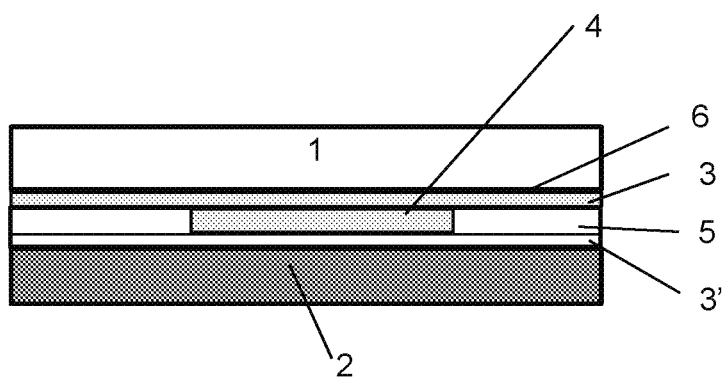
FIG. 2 shows a cross-sectional schematic of the glazing in FIG. 1 but assembled.

The glazing shown in FIGS. 1 and 2 is intended to be a constituent of an automotive roof. In this chosen application, a low light transmission is required in all circumstances, whether or not the PDLC film is actuated. For this reason the assembly formed of the glass sheets and the interlayers very substantially decrease transmission.

In the chosen example, the glazing comprises two glass sheets 1 and 2. Sheet 1 is made of clear glass to minimize its absorption of solar infrared. It is coated on its face that is turned toward the interlayers with a set of layers that selectively reflect the infrared, which set of layers is referenced 6 in FIG. 2. In the chosen example, it is a set comprising three layers of silver with dielectric layers separating these metal layers. The system of layers is of the type described in publication WO 2005/00348.

The proportion of incident energy that is transmitted through the system of layers is thus limited to about half. The combination of the clear glass sheet and the reflective layers limits the heating of the glazing, and therefore of the PDLC film, when it is exposed to solar radiation.

Under the glass sheet 1 coated with the reflective layers, a first interlayer sheet 3 of gray PVB makes contact with the PDLC film 4. The film itself is inserted into a frame 5 that is formed of a PVB sheet in which the housing for receiving the film 4 is produced. Another PVB sheet 3' makes contact with the second face of the film 4.

The interlayer sheets and the film 4 each have a thickness of 0.38 mm.

The second glass sheet is made of highly absorbent gray glass. Each glass sheet has a thickness of 2.1 mm.

The glass sheets and interlayers (in the absence of the PDLC film) together have a light transmission of 7-8%. The presence of the PDLC film allows this light transmission in scattered or transmitted form to be modified as indicated below.

In the reported trials the PDLC film was supplied by the company "Innoptec". This film, as most of the films of this type originating from other suppliers, was formed of a polymer matrix containing liquid crystals. This matrix was coated on each of its faces with electrodes formed of sheets of PET (polyethylene terephthalate) coated with a layer of conductive oxide (ITO).

Manufacturers firstly require that glazings including a PDLC film meet their requirements in respect of optical properties. To do this, in the unactuated state the glazing must scatter practically all the visible light that passes through the glazing. The scattering is that measured according to standard ASTMD 1003. It is done with an integrating sphere and comprises the light actually scattered as well as any light that is practically not deviated at all (less than 2° with respect to the incidence), which light is designated as transmitted light.

In the reported trials, the chosen illuminant was illuminant C.

The trialed film was firstly subjected to a sinusoidal AC current with a maximum voltage of 70 Vrms (i.e. a maximum of 100 V) and a frequency of 50 Hz.

Figure 3:
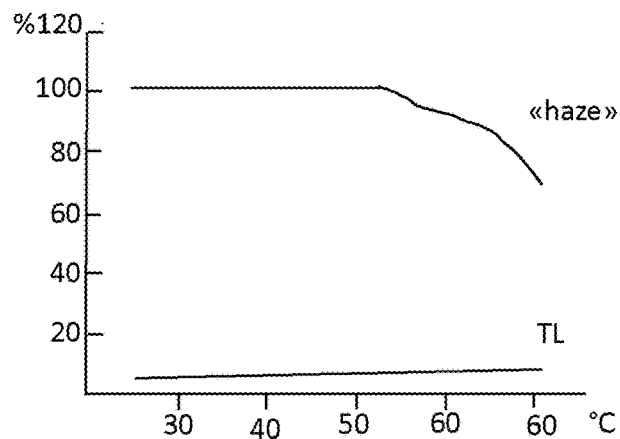
FIG. 3 is a graph illustrating the variation in the proportion of diffuse light ("haze") to the total, i.e. direct and diffuse, transmission, such as defined in standard ASTM 1003, as a function of temperature in the unactuated state.

In a first trial, the results of which are shown in FIG. 3, the variation in the ratio of the scattering to the total transmission (referenced "haze") and the value of the total transmission of the glazing as a function of the temperature of the glazing were measured. It may be seen that practically complete scattering is obtained in the unactuated state at room temperature. The percentage of total transmitted light is lower than 10%. Under these conditions, the glazing was translucent and played its role as a screen masking the objects located on the other side of the glazing with respect to the observer.

These characteristics remained little modified when the temperature of the glazing was increased to about 50° C. Beyond, the scattering character rapidly attenuated.

Figure 4:
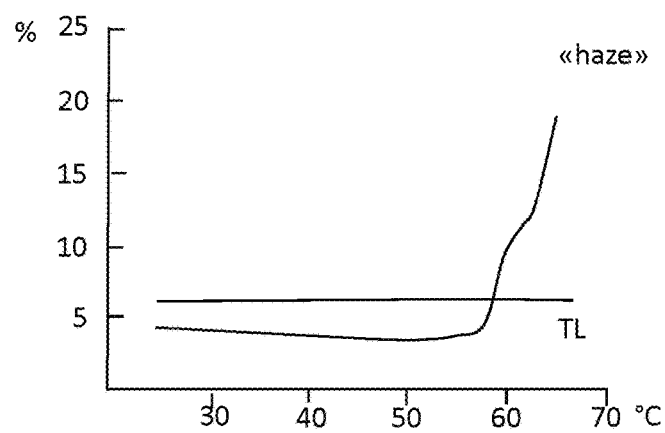
FIG. 4 is analogous to FIG. 3, the film being actuated.

The same glazing was tested under actuated conditions. The results are shown in FIG. 4. This time the scattering was very much less. The preceding ratio remained below 4% for temperatures below 55° C. It then increased because of a decrease in the effect of the electric field on the liquid-crystal particles.

The total transmission in the 2° of angle remained little changed at about 6%.

Figure 5:
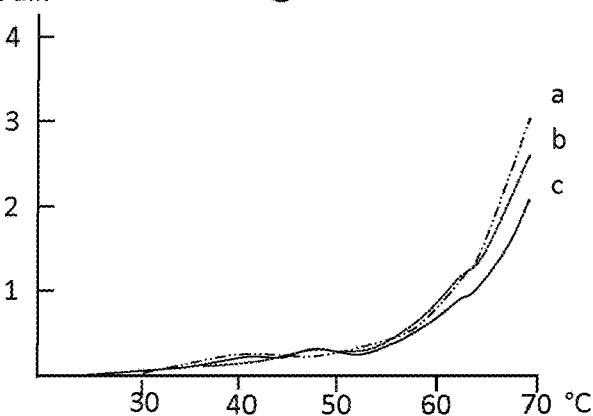
FIG. 5 shows, for three separate samples, the variation in the direct transmission TL in the unactuated state as a function of temperature.

FIG. 5 illustrates the ratio of the direct TL to the total amount of transmitted light (direct TL+scattered light) in unactuated mode for three separate samples (a, b, c). This ratio shows how effective the film is at creating a "private" mode.

Figure 6:
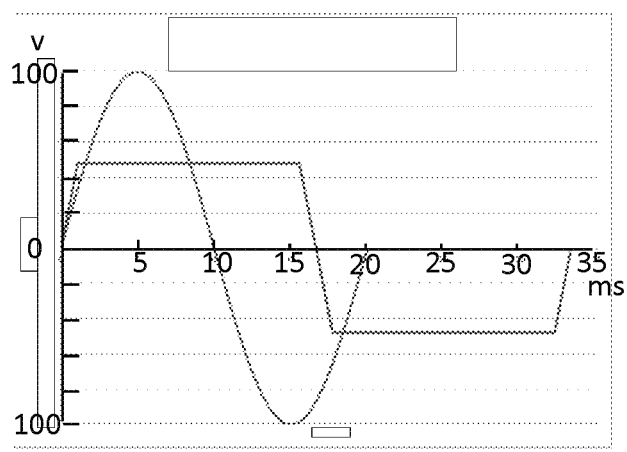
FIG. 6 illustrates a conventional voltage signal mode and a mode according to the invention.

To improve the characteristics of the supply of the PDLC film, the voltage used is such as shown in FIG. 6. This figure includes the "conventional" type with a supply the voltage (70 Vrms) of which varies sinusoidally at a frequency of 50 Hz. FIG. 6 also shows a supply according to the invention. According to the invention, the frequency is decreased to 30 Hz, and the voltage signal is of trapezoidal shape with an effective voltage of 48 Vrms. The voltage rise time is 1 ms and leads to a current that does not exceed 200 mA. It will be noted that the same frequency and the same voltage, but with a square signal, led to an initial current peak of about 2 A.

Figure 7:
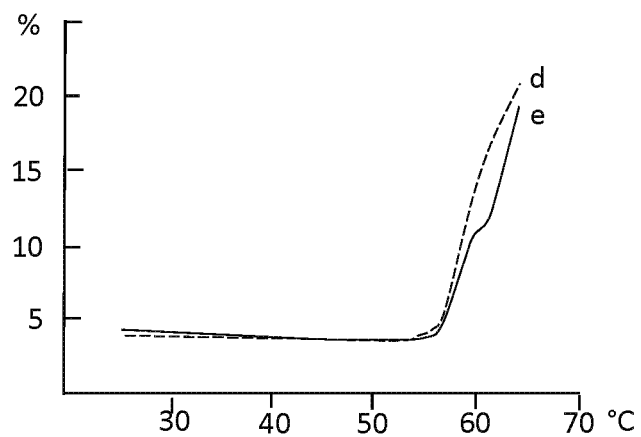
FIG. 7 shows by comparison the residual scattering in actuated mode under conventional conditions and under conditions according to the invention.
Figure 8:
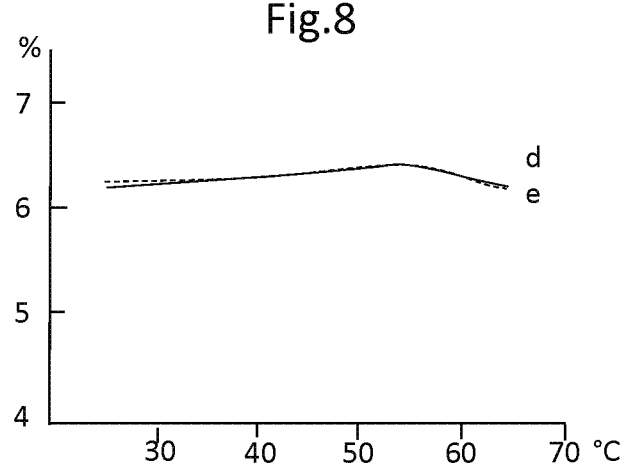
FIG. 8 just like FIG. 7 shows by comparison the total transmission for the actuated mode.

In the configuration according to the invention, it was first verified that the optical properties of the glazing had not been adversely affected. In the unactuated mode it goes without saying that nothing changed. For the actuated mode, the curves corresponding to the glazing according to the invention (d) and to the comparative glazing (e) in FIGS. 7 and 8 show that an almost perfect concordance was obtained in the residual scattering (FIG. 7) and the total transmission (FIG. 8). The supply mode according to the invention therefore perfectly preserves the properties of the PDLC film used under prior-art conditions.

Figure 9:
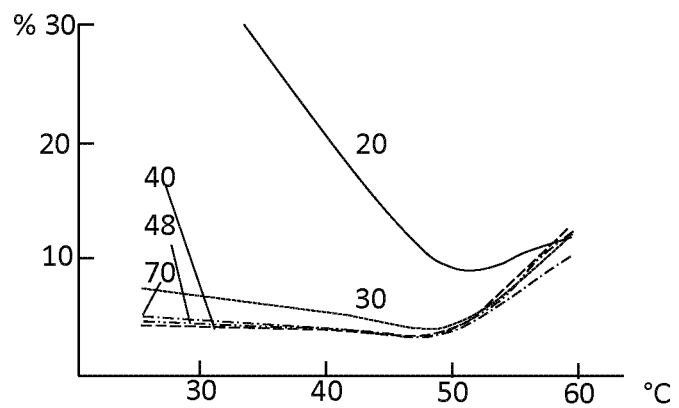
FIG. 9 shows the effect of various effective voltages on the residual scattering for trapezoidal signals.

FIG. 9 shows the variation in the residual scattering as a function of temperature for a frequency of 30 Hz and for various values of the effective voltage of a trapezoidal voltage signal. It will be noted that a minimum voltage is necessary to obtain a residual scattering of acceptable order of magnitude. At 20 Vrms the scattering is excessive. It decreases rapidly when the effective voltage reaches 30 V and practically stabilizes for the values of 40 and 48 Vrms, showing that an additional increase would be pointless. By way of indication, the prior-art mode is also noted in the figure (value 70 Vrms).

The power required under the various conditions was compared. The following table collates the recorded results. This table shows the shapes and frequencies applied, the effective voltage, and the power consumed per square meter of PDLC film. The measurements were carried out at a temperature of 60° C.

| Shape | Voltage Vrms | Frequency Hz | Power W/m² |
|---|---|---|---|
| Sinusoidal | 70 | 50 | 17 |
| Trapezoidal | 48 | 30 | 6.8 |
| Trapezoidal | 40 | 30 | 5.7 |
| Trapezoidal | 30 | 30 | 4.2 |
| Trapezoidal | 25 | 30 | 3.5 |

The first row corresponds to the reference serving as the basis for comparison. It will be noted that whatever the trial, under the conditions of the invention the consumed power was substantially less than for the comparative example. It will also be noted that for a given frequency (30 Hz) with a given signal shape, the power consumed decreases significantly with the applied effective voltage, the latter, if chosen with a little care, allowing a low residual scattering to be maintained, as indicated with regard to FIG. 9.

The invention claimed is:

1. A laminated automotive glazing comprising:
    a PDLC film powered electrically by an AC current having a frequency of from 20 Hz to less than 50 Hz, a voltage varying non-sinusoidally, a maximum of an effective voltage not exceeding 55 Vrms,
    wherein a residual scattering in an actuated state is no higher than 5% for a temperature not exceeding 50° C., and
    wherein power required to obtain the actuated state is no higher than 10 W/m² of PDLC film.
2. The glazing according to claim 1, wherein the maximum of the effective voltage does not exceed 50 Vrms and a minimum effective voltage is 30 Vrms.
3. The glazing according to claim 1, wherein a voltage variation has a trapezoidal profile.
4. The glazing according to claim 3, wherein the voltage does not exceed 50 Vrms.
5. The glazing according to claim 3, wherein the voltage variation has a trapezoidal shape with a rise time of 0.5 to 2 ms.
6. The glazing as claimed in claim 1, wherein the frequency is no lower than 25 Hz.
7. The glazing according to claim 1, wherein the residual scattering in the actuated state is no higher than 3% for a temperature not exceeding 60° C.
8. The glazing according to claim 1, wherein a direct light transmission in the unactuated state is no higher than 1%.
9. The glazing according to claim 1, wherein a direct light transmission in the unactuated state is no higher than 0.5%.
10. The glazing according to claim 1, wherein power required to obtain the actuated state is no higher than 5 W/m² of PDLC film.
11. The glazing according to claim 1, wherein a voltage variation has a square profile.
12. The glazing according to claim 1, wherein the maximum of the effective voltage does not exceed 50 Vrms.
13. The glazing according to claim 1, wherein the PDLC film is powered electrically by an AC current having a frequency of 30 Hz or lower.
14. The glazing according to claim 13, wherein the PDLC film is powered by a current that does not exceed 200 mA.
15. An automotive roof comprising:
    two glass sheets;
    a first interlayer sheet; and
    a PDLC film powered electrically by an AC current having a frequency of from 20 Hz to less than 50 Hz, a voltage varying non-sinusoidally, and a maximum of an effective voltage not exceeding 50 Vrms,
    wherein a residual scattering in an actuated state is no higher than 5% for a temperature not exceeding 50° C., and
    wherein power required to obtain the actuated state is no higher than 10 W/m² of PDLC film.
16. The glazing according to claim 15, wherein a voltage variation has a trapezoidal profile.
17. The glazing according to claim 15, further comprising second and third interlayer sheets,
    wherein the second interlayer sheet defines a housing for the PDLC film.
18. The glazing according to claim 15, wherein the minimum effective voltage is 30 Vims.

* * * * *